(12) United States Patent
Matsumoto

(10) Patent No.: US 8,839,643 B2
(45) Date of Patent: *Sep. 23, 2014

(54) FUSION BONDING PROCESS FOR GLASS

(75) Inventor: Satoshi Matsumoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 388 days.

This patent is subject to a terminal disclaimer.

(21) Appl. No.: 12/994,539

(22) PCT Filed: Jun. 3, 2009

(86) PCT No.: PCT/JP2009/060148
§ 371 (c)(1),
(2), (4) Date: Nov. 24, 2010

(87) PCT Pub. No.: WO2009/150975
PCT Pub. Date: Dec. 17, 2009

(65) Prior Publication Data
US 2011/0088431 A1   Apr. 21, 2011

(30) Foreign Application Priority Data
Jun. 11, 2008   (JP) .................................. 2008-153335

(51) Int. Cl.
*C03B 23/20*   (2006.01)

(52) U.S. Cl.
USPC ..................... 65/36; 65/33.6; 445/24; 445/25

(58) Field of Classification Search
USPC ................................................ 65/36, 43, 45
See application file for complete search history.

(56) References Cited

U.S. PATENT DOCUMENTS

| | | | |
|---|---|---|---|
| 3,663,793 A | 5/1972 | Petro et al. | |
| 4,343,833 A | 8/1982 | Sawae et al. | |

(Continued)

FOREIGN PATENT DOCUMENTS

| | | |
|---|---|---|
| CN | 1738777 | 2/2006 |
| CN | 1798708 | 7/2006 |

(Continued)

OTHER PUBLICATIONS

JP20022366050 (Human Translation), retrieved from USPTO Translation Services.*

(Continued)

*Primary Examiner* — Richard Crispino
*Assistant Examiner* — Yana B Krinker
(74) *Attorney, Agent, or Firm* — Drinker Biddle & Reath LLP

(57) ABSTRACT

When fixing a glass layer 3 to a glass member 4, a region to be fused R from an irradiation initiation position A in the region to be fused R to the irradiation initiation position A is irradiated therealong with a laser beam L1, and successively an unstable region extending from the irradiation initiation position A in the region to be fused R to a stable region initiation position B is therealong irradiated with the laser beam L1 again, so as to remelt the glass layer 3 in the unstable region, turn the unstable region into a stable region, and then fix the glass layer 3 to the glass member 4. Thereafter, a laser beam L2 fuses glass members 4, 5 together through the glass layer 3 having the whole region to be fused R turned into the stable region, so as to yield a glass fusing structure 1.

6 Claims, 12 Drawing Sheets

(56) References Cited

U.S. PATENT DOCUMENTS

| | | | |
|---|---|---|---|
| 2005/0103755 A1 | 5/2005 | Baker et al. | |
| 2006/0082298 A1 | 4/2006 | Becken et al. | |
| 2007/0007894 A1 | 1/2007 | Aitken et al. | |
| 2007/0128967 A1 | 6/2007 | Becken et al. | |
| 2007/0170845 A1 | 7/2007 | Choi et al. | |
| 2007/0173167 A1 | 7/2007 | Choi | |
| 2008/0124558 A1* | 5/2008 | Boek et al. | 428/427 |
| 2009/0297862 A1 | 12/2009 | Boek et al. | |
| 2010/0154476 A1* | 6/2010 | Becken et al. | 65/36 |
| 2011/0061789 A1 | 3/2011 | Matsumoto | |
| 2011/0072855 A1 | 3/2011 | Matsumoto et al. | |
| 2012/0151965 A1 | 6/2012 | Matsumoto et al. | |

FOREIGN PATENT DOCUMENTS

| | | | | |
|---|---|---|---|---|
| JP | 2-120259 | | 5/1990 | |
| JP | 5-166462 | | 7/1993 | |
| JP | 2002-366050 | | 12/2002 | |
| JP | 20022366050 | * | 12/2002 | G09F 9/00 |
| JP | 2004-182567 | | 7/2004 | |
| JP | 2005-007665 | | 1/2005 | |
| JP | 2005-213125 | | 8/2005 | |
| JP | 2006-524419 | | 10/2006 | |
| JP | 2008-115057 | | 5/2008 | |
| JP | 2008-115067 | | 5/2008 | |
| JP | 2008115057 | * | 5/2008 | C03C 8/14 |
| JP | 2008-127223 | | 6/2008 | |
| KR | 10-2007-0003681 | | 1/2007 | |
| TW | 200516064 | | 5/2005 | |
| TW | 200733787 | | 9/2007 | |
| TW | 200822789 | | 5/2008 | |
| WO | WO2007067533 | * | 6/2007 | H01L 21/56 |

OTHER PUBLICATIONS

JP 2008115057 (Human Translation), retrieved from USPTO Translation Services.*
U.S. Office Action dated Jun. 6, 2012 that issued in U.S. Appl. No. 13/345,199 including Double Patenting Rejections on pp. 5-8.
U.S. Office Action dated Jun. 28, 2012 that issued in U.S. Appl. No. 12/994,320 including Double Patenting Rejections on pp. 7-9.
U.S. Office Action dated Jul. 9, 2012 that issued in U.S. Appl. No. 12/994,321 including Double Patenting Rejections on pp. 7-9.
Cheung, Kerry, "Die-Level Glass Frit Vacuum Packaging for a Micro-Fuel Processor System," Massachusetts Institute of Technology, Jun. 2005, pp. 17-19.
JP 20022366050 (Machine Translation), as attached to Office Action dated Jun. 1, 2012 in U.S. Appl. No. 12/994,354.
JP 2008115057 (Machine Translation), as attached to Office Action dated Jun. 1, 2012 in U.S. Appl. No. 12/994,354.
U.S. Office Action dated May 9, 2013 that issued in U.S. Appl. No. 12/994,399 including Double Patenting Rejections on pp. 6-10.
U.S. Office Action dated Jan. 22, 2013 that issued in U.S. Appl. No. 13/345,199 including Double Patenting Rejections on pp. 6-8.
U.S. Office Action dated Jan. 16, 2014 that issued in U.S. Appl. No. 13/511,735 including Double Patenting Rejections on pp. 4-8.
U.S. Office Action dated Jan. 28, 2014 that issued in U.S. Appl. No. 13/511,688 including Double Patenting Rejections on pp. 4-8.
U.S. Office Action dated Jun. 3, 2014 that issued in U.S. Appl. No. 13/511,683 including Double Patenting Rejections on pp. 5-11.
U.S. Office Action dated Jul. 2, 2014 that issued in U.S. Appl. No. 13/511,754 including Double Patenting Rejections on pp. 5-8.
U.S. Office Action dated Jul. 31, 2014 that issued in U.S. Appl. No. 12/994,354 including Double Patenting Rejections on pp. 7-10.

* cited by examiner

FUSION BONDING PROCESS FOR GLASS

TECHNICAL FIELD

The present invention relates to a glass fusing method for manufacturing a glass fusing structure by fusing glass members together.

BACKGROUND ART

Known as a conventional glass fusing method in the above-mentioned technical field is one comprising burning a glass layer containing a laser-absorbing pigment onto one glass member along a region to be fused, then overlaying the other glass member on the former glass member such that the glass layer is interposed therebetween, and irradiating the region to be fused therealong with a laser beam, so as to fuse one glass member and the other glass member together.

Meanwhile, a typical technique for burning a glass layer onto a glass member is one removing an organic solvent and a binder from a paste layer containing a glass frit, a laser-absorbing pigment, the organic solvent, and the binder, so as to fix the glass layer firmly to the glass member; and then heating the glass member having the glass layer firmly attached thereto in a firing furnace, so as to melt the glass layer, thereby burning the glass layer onto the glass member (see, for example, Patent Literature 1).

On the other hand, proposed from the viewpoint of suppressing the increase in energy consumption and burning time caused by the use of the firing furnace (i.e., the viewpoint of higher efficiency) is a technique which irradiates a glass layer firmly attached to a glass member with a laser beam, so as to melt the glass layer, thereby burning the glass layer onto the glass member (see, for example, Patent Literature 2).

CITATION LIST

Patent Literature

Patent Literature 1: Japanese Translated International Patent Application Laid-Open No. 2006-524419
Patent Literature 2: Japanese Patent Application Laid-Open No. 2002-366050

SUMMARY OF INVENTION

Technical Problem

However, there have been cases where the fused state becomes uneven in the glass members fused together through the glass layer burned onto the glass member by irradiation with a laser beam.

In view of such circumstances, it is an object of the present invention to provide a glass fusing method which can attain a uniform fused state between the glass members.

Solution to Problem

For achieving the above-mentioned object, the inventor conducted diligent studies and, as a result, has found out that the fused state between the glass members becomes uneven because of the fact that the laser absorptance of the glass layer drastically increases when the temperature of the glass layer exceeds its melting point Tm at the time of burning as illustrated in FIG. 10. That is, in the glass layer firmly attached to the glass member, voids formed by the removal of the binder and the particle property of the glass frit produce scattering of light exceeding the absorption characteristic of the laser-absorbing pigment, so that the laser absorptance is low (e.g., the glass layer appears whiter under visible light). When a laser beam is emitted in such a state in order to burn the glass layer onto the glass member, the glass frit melts to fill the voids and loses the particle property, so that the laser-absorbing pigment remarkably exhibits its absorption characteristic, whereby the glass layer drastically increases its laser absorptance (e.g., appears darker under visible light). Here, as illustrated in FIG. 11, the laser beam has such a temperature distribution that the temperature at the center part in the width direction (direction substantially orthogonal to the laser beam moving direction) becomes higher. Therefore, when the laser beam is moved forward after staying at an irradiation initiation position for a while in order to make a stable region where the glass layer melts throughout the width from the irradiation initiation position, the melting initiated at the widthwise center part may raise the laser absorptance at the center part so that the center part falls into an excessive heat input state, thereby causing cracks in the glass member and crystallizing the glass layer. When the laser beam is moved forward before melting the glass layer throughout the width at the laser beam irradiation initiation position as illustrated in FIG. 12, an unstable region where the width of melting gradually increases from the center part extends from the irradiation initiation position until a stable state is attained. Since the laser absorptance varies between the unstable and stable regions, a glass fusing structure having an uneven fused state is manufactured when glass members are fused together through the glass layer having such an unstable region. The inventor has further conducted studies based on this finding, thereby completing the present invention. The change in color of the glass layer under visible light in the case where the laser absorptance of the glass layer is enhanced by the melting of the glass layer is not limited to the change from a whiter state to a darker state. For example, laser-absorbing pigments for near-infrared laser beams include those exhibiting green when the glass layer melts.

The glass fusing method in accordance with the present invention is a glass fusing method for manufacturing a glass fusing structure by fusing first and second glass members, the method comprising the steps of disposing a glass layer on the first glass member along a ring-shaped region to be fused, the glass layer being formed by removing an organic solvent and a binder from a paste layer containing a glass powder, a laser-absorbing material, the organic solvent and the binder; irradiating the region to be fused therealong from an irradiation initiation position in the region to be fused to the irradiation initiation position with a first laser beam and successively irradiating a predetermined region extending from the irradiation initiation position in the region to be fused therealong with the first laser beam again, so as to melt the glass layer and fix the glass layer to the first glass member; and overlaying the second glass member on the first glass member having the glass layer fixed thereto such that the glass layer is interposed therebetween, and irradiating the region to be fused thereal ong with a second laser beam, so as to fuse the first and second glass members together.

In this glass fusing method, when fixing the glass layer to the first glass member, a predetermined region extending from the irradiation initiation position in the region to be fused is irradiated therealong with the first laser beam again, so as to remelt the glass layer in the predetermined region. Such remelting turns the predetermined region into a stable region, whereby the glass layer having reduced the unstable region in the region to be fused is fixed to the first glass member. As a result, the first and second glass members are fused together through the glass layer having reduced the unstable region, whereby the fused state between the glass members can be made uniform. Here, the "stable region" means a region where the glass layer is melted throughout its width, whereas the "unstable region" means a region where the glass layer is melted only in a part of the width. The "ring" used herein includes at least circular rings and rectangular rings.

Preferably, in the glass fusing method in accordance with the present invention, the predetermined region includes the whole unstable region where the melting of the glass layer becomes unstable when irradiated once from the irradiation initiation position with the first laser beam. When the predetermined region to be irradiated with the first laser beam again includes the whole unstable region, the glass layer having further reduced the unstable region in the region to be fused can be fixed to the first glass member.

Preferably, in the glass fusing method in accordance with the present invention, an irradiation power for irradiating the predetermined region therealong with the first laser beam again is lower than that for initially irradiating the predetermined region therealong with the first laser beam. The predetermined region is partly melted by the initial irradiation with the first laser beam and can be melted on a par with the other stable region by remelting with a reduced irradiation power, so that the region to be fused is melted uniformly. More preferably, in this case, the irradiation power during irradiating the predetermined region therealong with the first laser beam again is gradually lowered. When the irradiation power is gradually lowered, an unstable region where the ratio of the melted region gradually rises in the moving direction of the first laser beam can efficiently be replaced by a stable region, so that the melting in the region to be fused can be made more uniform.

Advantageous Effects of Invention

The present invention can attain a uniform fused state between glass members.

DESCRIPTION OF EMBODIMENTS

Figure 1:
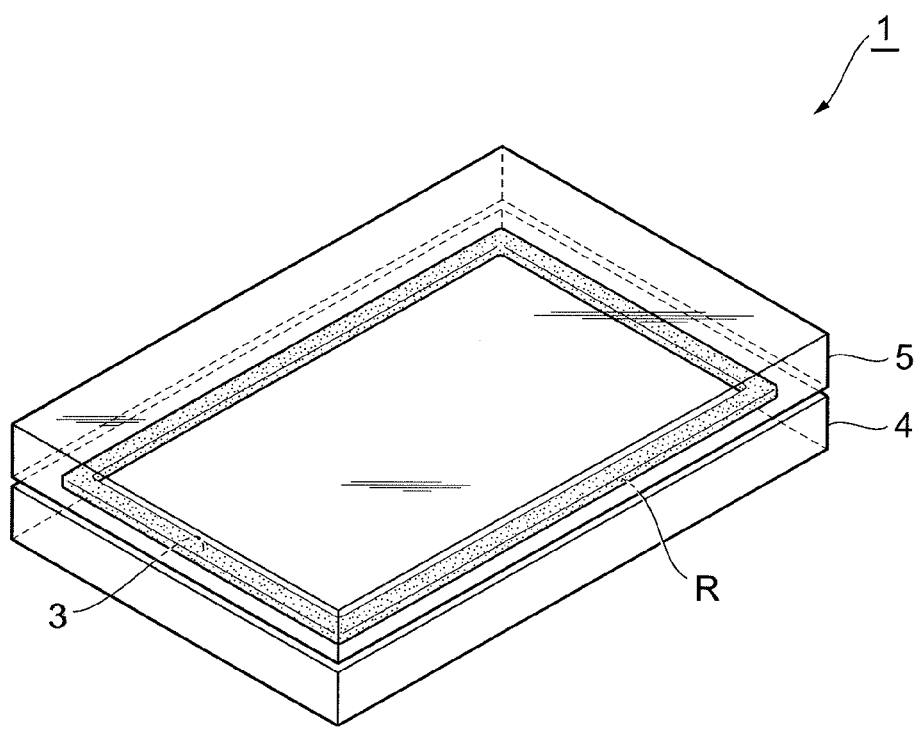
FIG. 1 is a perspective view of a glass fusing structure manufactured by an embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

FIG. 1 is a perspective view of the glass fusing structure manufactured by an embodiment of the glass fusing method in accordance with the present invention. As illustrated in FIG. 1, the glass fusing structure 1 is a fusion-bonded grass structure in which glass members (first and second glass members) 4, 5 are fused together through a glass layer 3 formed along a region to be fused R. For example, each of the glass members 4, 5 is a rectangular plate-shaped member made of alkali-free glass having a thickness of 0.7 mm, while the region to be fused R is set like a rectangular ring along the outer edges of the glass members 4, 5. For example, the glass layer 3 is made of low-melting glass (vanadium-phosphate-based glass, lead borosilicate glass, or the like) and formed into a rectangular ring along the region to be fused R with a predetermined width.

The glass fusing method for manufacturing the above-mentioned glass fusing structure 1 will now be explained.

Figure 2:
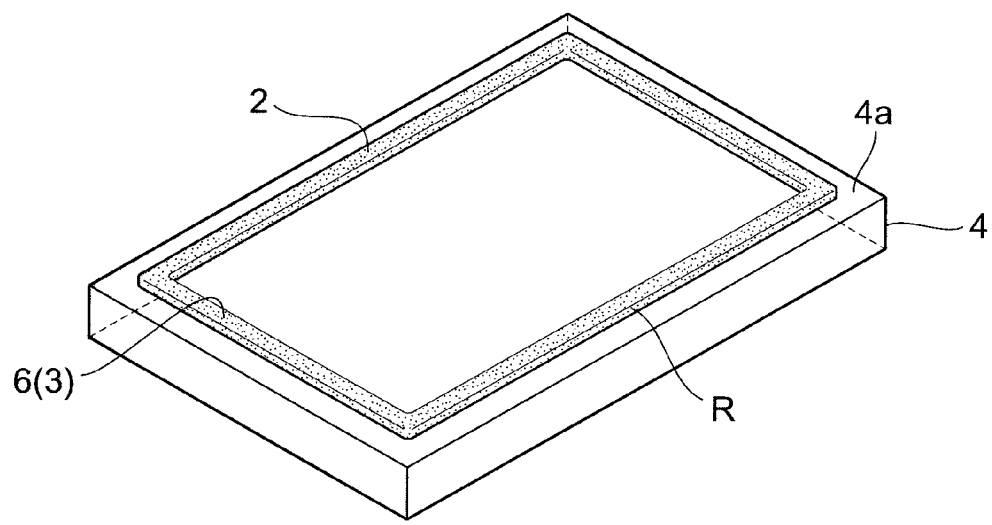
FIG. 2 is a perspective view for explaining the glass fusing method for manufacturing the glass fusing structure of FIG. 1.

First, as illustrated in FIG. 2, a frit paste is applied by a dispenser, screen printing, or the like, so as to form a paste layer 6 on a surface 4a of the glass member 4 along a closed-ring-shaped region to be fused R. An example of the frit paste is one formed by kneading a powdery glass frit (glass powder) 2 made of amorphous low-melting glass (vanadium-phosphate-based glass, lead borosilicate glass, or the like), a laser-absorbing pigment (laser-absorbing material) which is an inorganic pigment such as iron oxide, an organic solvent such as amyl acetate, and a binder which is a resin component (such as acrylic resin) thermally decomposable at the glass softening temperature or lower. The frit paste may also be one in which a glass frit (glass powder) made of powdered low-melting glass doped beforehand with a laser-absorbing pigment (laser-absorbing material), an organic solvent, and a binder are kneaded together. That is, the paste layer 6 contains the glass frit 2, laser-absorbing pigment, organic solvent, and binder.

Subsequently, the paste layer 6 is dried, so as to eliminate the organic solvent, and further heated, so as to remove the binder, thereby firmly attaching the glass layer 3 formed into a closed rectangular ring to the surface 4a of the glass member 4 along the region to be fused R. Here, voids formed by the removal of the binder and the particle property of the glass frit 2 produce scattering of light exceeding the absorption characteristic of the laser-absorbing pigment, so that the glass layer 3 firmly attached to the surface 4a of the glass member 4 is in a low laser absorptance state (e.g., appears whiter under visible light).

Figure 3:
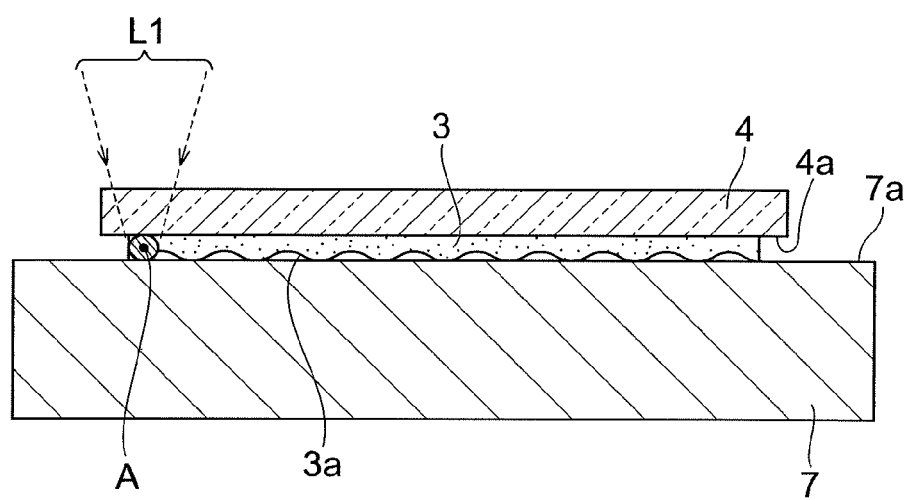
FIG. 3 is a perspective view for explaining the glass fusing method for manufacturing the glass fusing structure of FIG. 1.

Next, as illustrated in FIG. 3, the glass member 4 is mounted on a surface 7a (a polished surface here) of a planar mount table 7 made of aluminum, such that the glass layer 3 is interposed therebetween. As a consequence, the glass layer 3 formed by removing the organic solvent and binder from the paste layer 6 is disposed between the glass member 4 and the mount table 7 along the region to be fused R.

Figure 4:
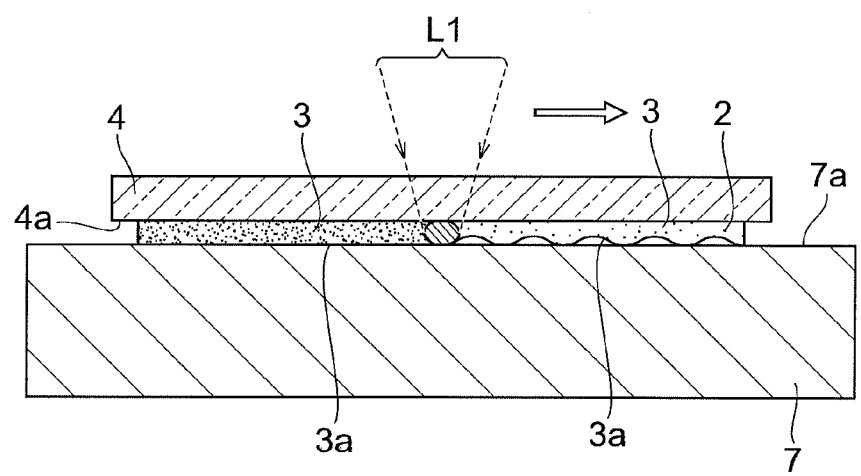
FIG. 4 is a perspective view for explaining the glass fusing method for manufacturing the glass fusing structure of FIG. 1.
Figure 5:
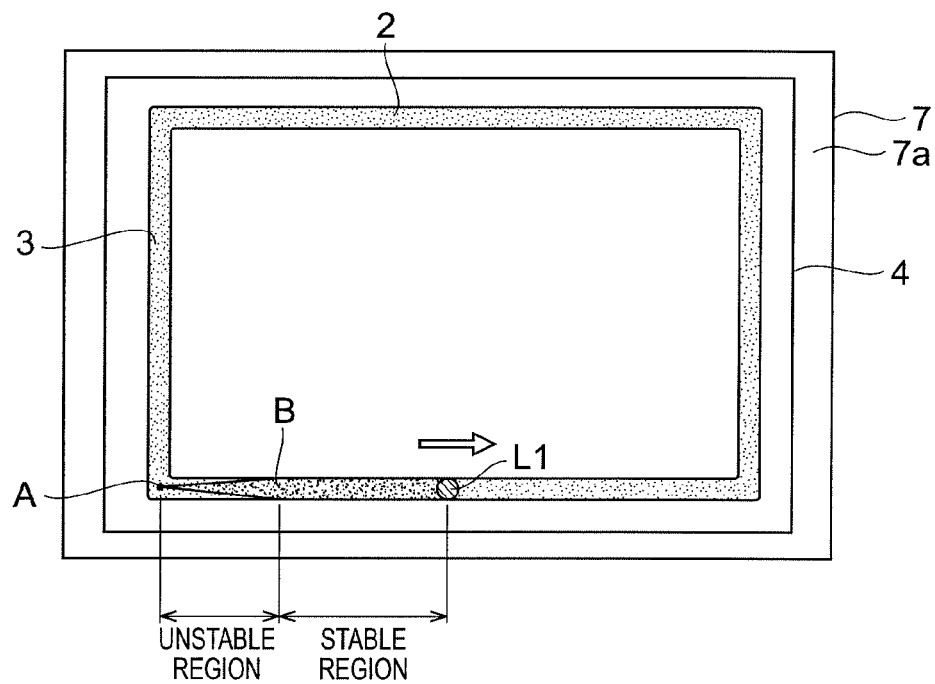
FIG. 5 is a perspective view for explaining the glass fusing method for manufacturing the glass fusing structure of FIG. 1.
Figure 11:
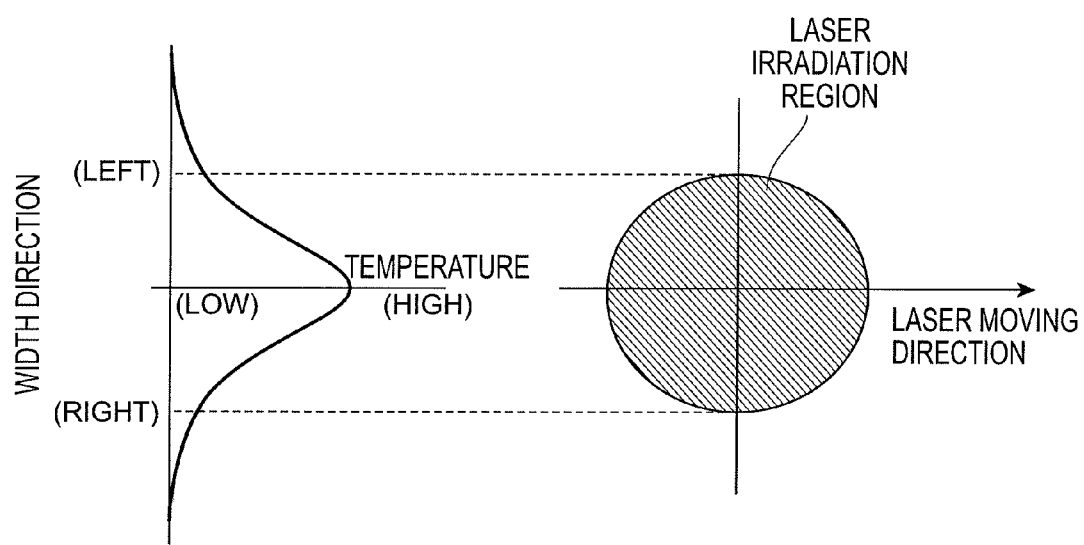
FIG. 11 is a graph illustrating a temperature distribution in laser irradiation.
Figure 12:
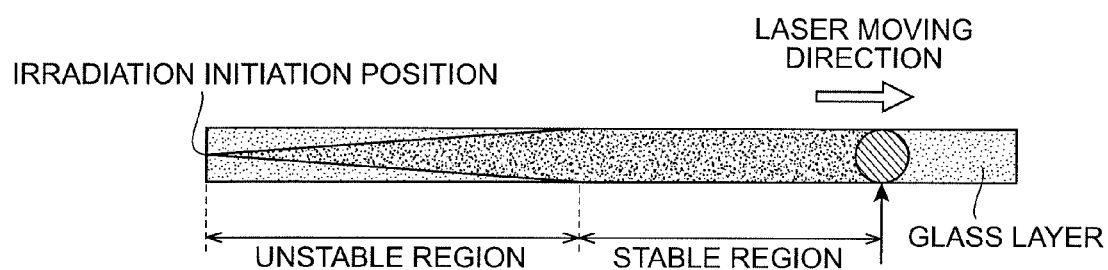
FIG. 12 is a diagram illustrating stable and unstable regions in laser irradiation.

Then, as illustrated in FIGS. 3 to 5, irradiation with a laser beam (first laser beam) L1 begins with its converging spot located at an irradiation initiation position A and shifts in an arrowed moving direction along the region to be fused R. As illustrated in FIG. 5, since the laser beam L1 has the above-mentioned temperature distribution (see FIG. 11), there is a predetermined distance from the irradiation initiation position A to a stable region initiation position which becomes a stable region where melting is effected throughout the width of the glass layer 3 (in a direction substantially orthogonal to the laser beam moving direction), so that an unstable region where the glass layer 3 is melted only in a part of the width thereof extends from the irradiation initiation position A to the stable region initiation position B. As illustrated in FIG. 5 or 12, the melted width of the glass layer 3, i.e., the ratio of the melted region, in the unstable region gradually increases in the moving direction of the laser beam L1.

Figure 6:
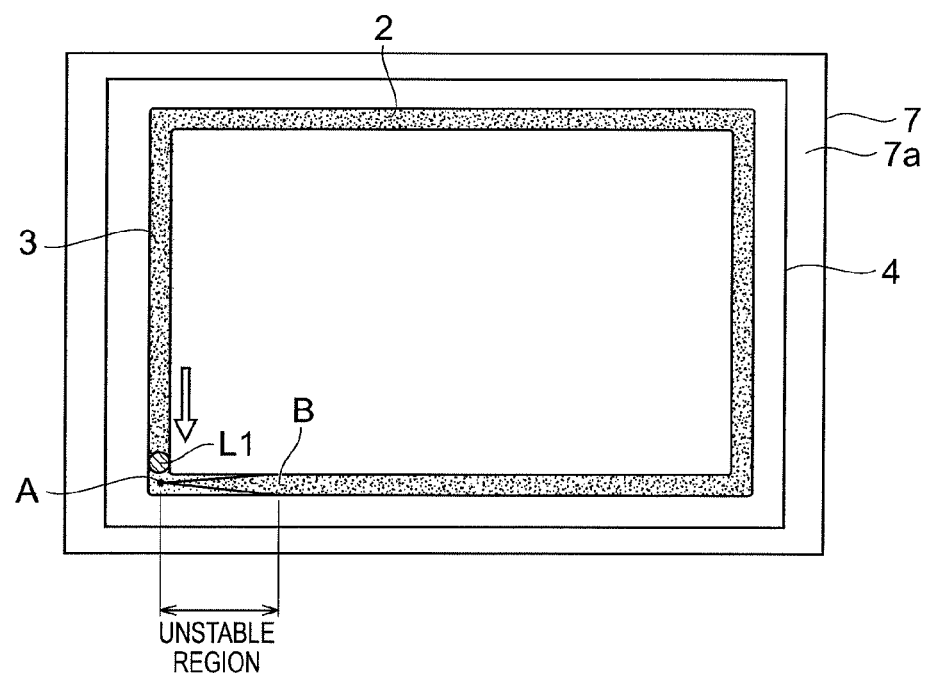
FIG. 6 is a perspective view for explaining the glass fusing method for manufacturing the glass fusing structure of FIG. 1.
Figure 7:
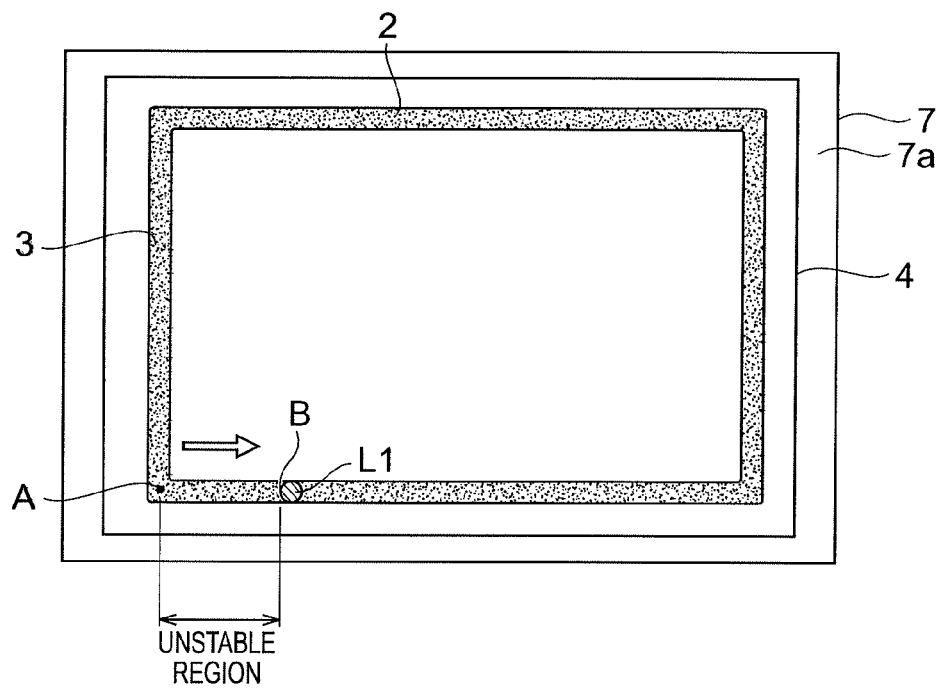
FIG. 7 is a perspective view for explaining the glass fusing method for manufacturing the glass fusing structure of FIG. 1.

Thereafter, as illustrated in FIG. 6, the glass layer 3 is continuously irradiated with the laser beam L1 along the region to be fused R beyond the stable region initiation position B until it returns to the irradiation initiation position A; and, as illustrated in FIG. 7, the irradiation with the laser beam L1 is further continued along the unstable region from the irradiation initiation position A to the stable region initiation position B where the melting of the glass layer 3 becomes stable, so as to remelt the glass layer 3 in the unstable region. Since the unstable region has once been irradiated with the laser beam so as to increase the ratio of the melted region gradually in the laser beam moving direction, the irradiation power of the laser beam L1 at the time of irradiating the unstable region again therealong is gradually lowered so as to become zero when the laser beam L1 passes the stable region initiation position B or thereabout.

The unstable region is thus irradiated with the laser beam L1 in an overlapping manner, so that the glass layer 3 disposed on the glass member 4 is stably melted and resolidified throughout the region to be fused R, whereby the glass layer 3 is burned onto the surface 4a of the glass member 4. Here, as the glass frit 2 melts to fill the voids, the glass layer 3 burned onto the surface 4a of the glass member 4 loses the particle property, so as to allow the laser-absorbing pigment to exhibit its absorption characteristic remarkably, thereby increasing the laser absorptance (e.g., appearing darker under visible light).

After the glass layer 3 is stably burned onto the whole region to be fused R, the glass member 4 having the glass layer 3 burned thereonto is removed from the mount table 7. Here, since the difference between the coefficients of linear expansion of the glass frit 2 and the mount table 7 is greater than the difference between the coefficients of linear expansion of the glass frit 2 and the glass member 4, the glass layer 3 does not firmly attach to the mount table 7. Since the surface 7a of the mount table 7 is polished, the glass layer 3 burned onto the surface 4a of the glass member 4 is in a state where irregularities on the surface 3a on the side opposite from the glass member 4 are made flat. In this embodiment, the burning is carried out by irradiation with the laser beam L1 from the glass member 4 side, so that the glass layer 3 is reliably fixed to the glass member 4, while crystallization is reduced on the surface 3a side, whereby the melting point does not rise in this part.

Figure 8:
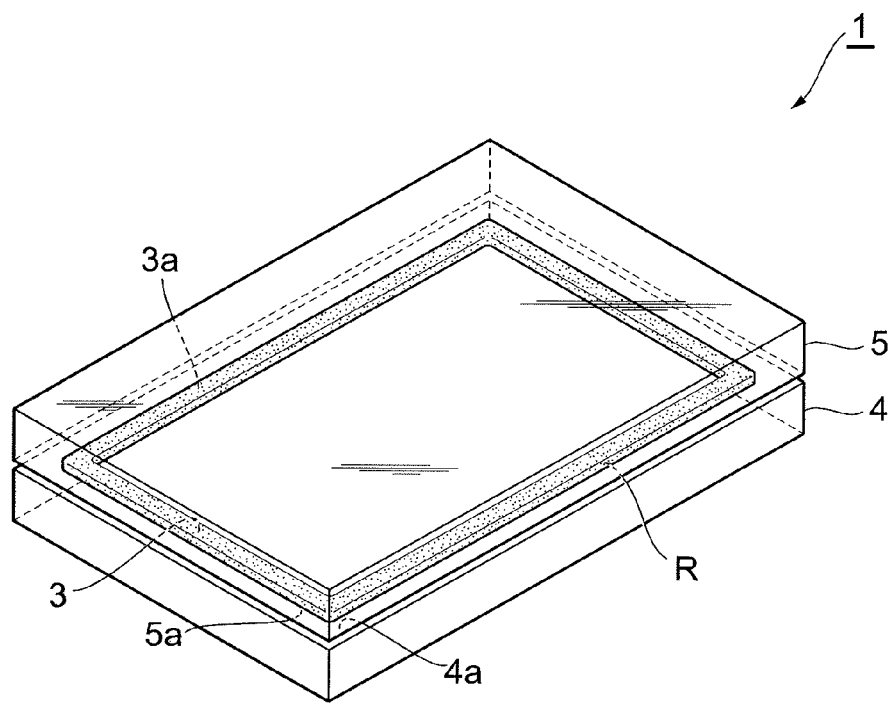
FIG. 8 is a perspective view for explaining the glass fusing method for manufacturing the glass fusing structure of FIG. 1.

Subsequent to the burning of the glass layer 3, as illustrated in FIG. 8, the glass member 5 is overlaid on the glass member 4 having the glass layer 3 burned thereonto, such that the glass layer 3 is interposed therebetween. Here, since the surface 3a of the glass layer 3 is made flat, a surface 5a of the glass member 5 comes into contact with the surface 3a of the glass layer 3 without gaps.

Figure 9:
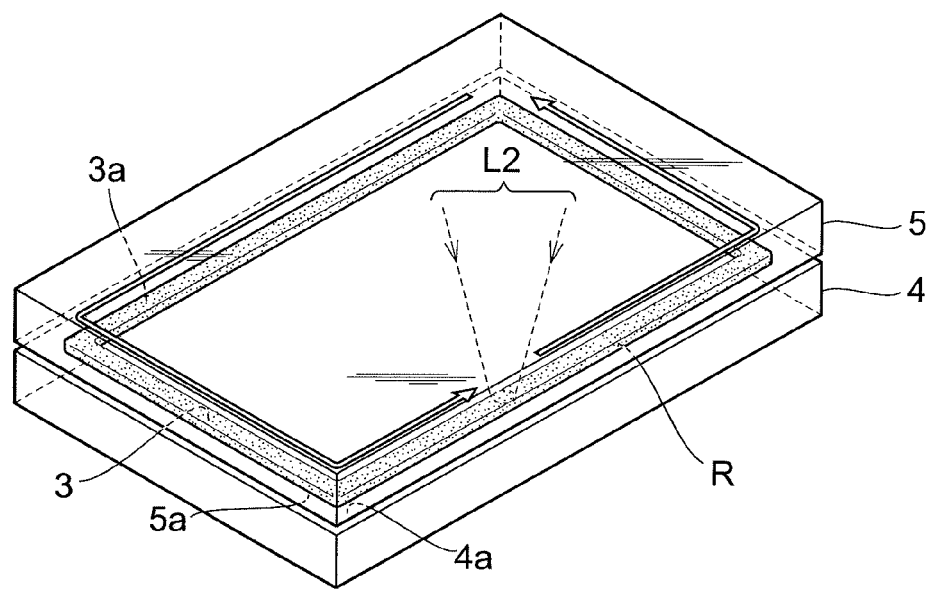
FIG. 9 is a perspective view for explaining the glass fusing method for manufacturing the glass fusing structure of FIG. 1.
Figure 10:
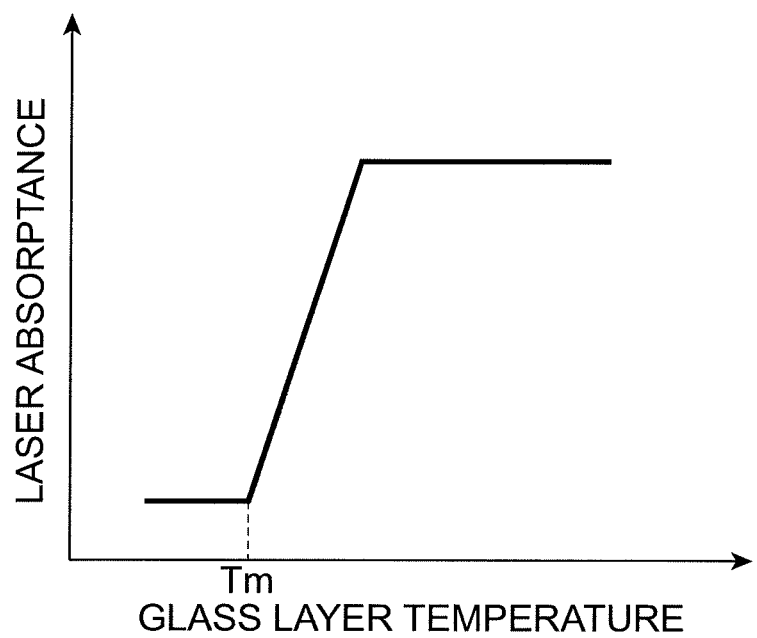
FIG. 10 is a graph illustrating the relationship between the temperature and laser absorptance of a glass layer.

Then, as illustrated in FIG. 9, the region to be fused R is irradiated therealong with a laser beam (second laser beam) L2 while locating a converging spot at the glass layer 3. As a consequence, the glass layer 3 in a uniform state with a high laser absorptance throughout the region to be fused R absorbs the laser beam L2, which melts and resolidifies the glass layer 3 and its peripheral portions (the portions of the glass members 4, 5 on the surfaces 4a, 5a) to similar extents, thereby bonding the glass members 4, 5 together. Here, the surface 5a of the glass member 5 comes into contact with the surface 3a of the glass layer 3 without gaps, while the glass layer 3 burned onto the glass member 4 is formed as a stable region where the melting is stable throughout the region to be fused R, whereby the glass members 4, 5 are uniformly fused along the region to be fused R.

As explained in the foregoing, when fixing the glass layer 3 to the glass member 4, the glass fusing method for manufacturing the glass fusing structure 1 irradiates the unstable region extending from the irradiation initiation position A in the region to be fused R to the stable region initiation position B in the region to be fused R therealong with the laser beam L1 again, so as to remelt the glass layer 3 in the unstable region. Such remelting turns the unstable region into a stable region, whereby the glass layer 3 whose melting is made stable throughout the region to be fused R is fixed to the glass member 4. As a result, the glass members 4, 5 are fused through the glass layer 3 formed with such a stable region, whereby the fused state between the glass members 4, 5 can be made uniform.

In the above-mentioned glass fusing method, the irradiation power for irradiating the unstable region therealong with the laser beam L1 again is made gradually lower than that for initially irradiating the unstable region therealong with the laser beam L1. Thus gradually lowering the irradiation power can efficiently turn the unstable region where the ratio of the melted region gradually increases in the moving direction of the laser beam L1 into the stable region, whereby the melting of the whole region to be fused R can be made further uniform.

The present invention is not limited to the above-mentioned embodiment.

For example, while this embodiment uses the region to be fused R having a substantially rectangular ring form, any ring-shaped region to be fused may be used, an example of which is a circular ring-shaped region to be fused.

Though the glass layer 3 is irradiated with the laser beam L1 through the glass member 4 in this embodiment, the glass layer 3 may be directly irradiated with the laser beam L1 from the opposite side.

INDUSTRIAL APPLICABILITY

The present invention can attain a uniform fused state between glass members.

REFERENCE SIGNS LIST

1 . . . glass fusing structure; 2 . . . glass frit (glass powder); 3 . . . glass layer; 4 . . . glass member (first glass member); 5 . . . glass member (second glass member); 6 . . . paste layer; 7 . . . mount table; A . . . irradiation initiation position; B . . .

stable region initiation position; R . . . region to be fused; L1 . . . laser beam (first laser beam); L2 . . . laser beam (second laser beam)

The invention claimed is:

1. A glass fusing method for manufacturing a glass fusing structure by fusing first and second glass members, the method comprising the steps of:
    (a) disposing a glass layer on the first glass member along a ring-shaped region to be fused, the glass layer being formed by removing an organic solvent and a binder from a paste layer containing a glass powder, a laser-absorbing material, the organic solvent and the binder;
    (b) irradiating the ring-shaped region to be fused therealong from an irradiation initiation position in the ring-shaped region to be fused around the ring-shaped region to be fused and back to the irradiation initiation position with a first laser beam;
    (c) successively irradiating again a predetermined region extending from the irradiation initiation position in the ring-shaped region to be fused therealong with the first laser beam, wherein the predetermined region consists of an unstable region of the ring-shaped region to be fused, so as to melt the glass layer and fix the glass layer to the first glass member; and
    (d) overlaying the second glass member on the first glass member having the glass layer fixed thereto such that the glass layer is interposed therebetween, and irradiating the ring-shaped region to be fused therealong with a second laser beam, so as to fuse the first and second glass members together,
    wherein in the step of fixing the glass layer to the first glass member, melting the glass layer increases the laser beam absorptance of the glass layer.

2. A glass fusing method according to claim 1, wherein an irradiation power for irradiating the predetermined region therealong with the first laser beam in step (c) is lower than the irradiation power for initially irradiating the predetermined region therealong with the first laser beam in step (b).

3. A glass fusing method according to claim 2, wherein the irradiation power is lowered during irradiation of the predetermined region therealong with the first laser beam in step (c).

4. A glass layer fixing method for fixing a glass layer to a first glass member along a region to be fused in which the first glass member and a second glass member are adapted to be fused together, the method comprising the steps of:
    (a) disposing the glass layer on the first glass member along the ring-shaped region to be fused, the glass layer being formed by removing an organic solvent and a binder from a paste layer containing a glass powder, a laser-absorbing material, the organic solvent and the binder;
    (b) irradiating the ring-shaped region to be fused therealong from an irradiation initiation position in the ring-shaped region to be fused around the ring-shaped region to be fused and back to the irradiation initiation position with a first laser beam;
    (c) successively irradiating again a predetermined region extending from the irradiation initiation position in the ring-shaped region to be fused therealong with the first laser beam again, wherein the predetermined region consists of an unstable region of the ring-shaped region to be fused, so as to melt the glass layer and fix the glass layer to the first glass member; and,
    (d) overlaying the second glass member on the first glass member having the glass layer fixed thereto such that the glass layer is interposed therebetween, and irradiating the ring-shaped region to be fused therealong with a second laser beam, so as to fuse the first and second glass members together,
    wherein in the step of fixing the glass layer to the first glass member, melting the glass layer increases the laser beam absorptance of the glass layer.

5. A glass layer fixing method according to claim 4, wherein an irradiation power for irradiating the predetermined region therealong with the first laser beam in step (c) is lower than the irradiation power for initially irradiating the predetermined region therealong with the first laser beam in step (b).

6. A glass layer fixing method according to claim 5, wherein the irradiation power is lowered during irradiation of the predetermined region therealong with the first laser beam in step (c).

* * * * *